FIG. 1

| PULSE NUMBER | WINDINGS | | | |
|---|---|---|---|---|
| | A | B | C | D |
| 1 | ON | ON | — | — |
| 2 | — | ON | ON | — |
| 3 | — | — | ON | ON |
| 4 | ON | — | — | ON |
| 5 | ON | ON | — | — |
| 6 | — | ON | ON | — |
| 7 | ON | — | ON | — |
| 8 | ON | ON | — | ON |
| 9 | — | ON | — | ON |
| 10 | — | ON | ON | — |

FIG.2

INVENTOR
HAROLD R. NEWELL

BY *Hurwitz + Rose*

ATTORNEYS

United States Patent Office 3,444,447
Patented May 13, 1969

3,444,447
MULTI-PHASE STEP MOTOR CONTROL CIRCUITS INCLUDING MEANS FOR SUPPLEMENTING THE NORMAL ENERGIZATION OF THE WINDINGS
Harold R. Newell, South Newbury, N.H., assignor to Mesur-Matic Electronics Corporation, Warner, N.H., a corporation of Delaware
Filed Sept. 22, 1966, Ser. No. 581,334
Int. Cl. H02k 29/02
U.S. Cl. 318—138                                    12 Claims The present invention relates generally to control circuits and, more particularly, to drive circuits for multi-phase step motors.

In general, multi-phase step motors are operated or driven by sequentially switching the DC supply voltage to the several windings for equal increments of time. For example, a four phase step motor having successive field windings, A, B, C, and D arranged relative to each other and to the rotor such as to produce upon energization, a magnetic field tending to exert a torque on the rotor, would normally be stepped through discrete equi-angular shaft orientations by selectively applying a driving voltage to the windings (coils) A, B, C, D, A, B, C, D, etc. for equal intervals of time. Certain improvements in the step motor operation, and specifically an increase in torque may be obtained by a variation of the sequential energization of windings, namely, application of the energizing voltage to two windings at a time in the equal time interval sequence, such as by exciting the windings according to the format A+B, B+C, C+D, D+A, A+B, etc.

An increase in switching speed to produce higher incremental rotational velocities of the shaft, that is, high speed stepping, however, is characterized by a reduction in coil current and consequently a reduction in the torque-producing magnetic field, because of the motor coil inductance. As is well known, current through an inductive element cannot undergo an instantaneous (non-continuous) change in magnitude except by supplying the inductor with discrete "packages" of current in the form of impulses of substantially infinitesimal width (i.e., impulse widths approaching zero). It goes without saying that such current impulses are unrealistic in practice. It is possible to assure sufficient current for high switching speeds by increasing supply voltage, but this method too is impractical, although certainly readily achievable, because it requires advance knowledge of exact times that high stepping speeds will be required, information which is generally not foreseeable or available a priori, and because it leads to excessive winding currents, as a consequence of the increased supply voltage, when motor operation is ceased.

Another method of providing sufficient current for the desired high switching speed is implemented by use of a dropping resistor and capacitor in parallel circuit through which an increased supply voltage is applied to the windings. The capacitor serves to insure rapid build-up of current through the coils during switching and the dropping resistor functions to reduce winding currents during periods when the motor is stopped. It is apparent that this method, like that mentioned immediately above, requires an abnormally high power supply voltage. Moreover, in the former case the voltage must be varied according to the desired motor speed, while in the latter case a significant amount of power is dissipated in the dropping resistor.

Accordingly, it is a primary object of the present invention to provide improved control systems for multi-phase step motors.

It is another broad object of the present invention to provide step motor controls adapted to overcome various disadvantages of the type mentioned above, attendant in the use of prior art controls.

A more specific object of the invention is to provide a multi-phase step motor driver adapted to instantaneously, continuously and automatically supply increased current to the motor windings during periods in which high switching speed is desired, without appreciably increasing supply voltage.

It is a further object of the invention to provide a multi-phase step motor driver capable of supplying high torque-producing currents to the motor field windings at high switching speeds.

Briefly, in accordance with the present invention, multi-phase driver circuitry is provided wherein a plurality of switching circuits, corresponding in number to the number of stepping phases to which the motor is to be subjected, are sequentially activated according to a predetermined switching logic program. The field windings of the motor are excited according to the energization of the driver switching circuits with which they are associated so that each step phase has "on" periods, i.e. time intervals during which the field winding corresponding to that phase is excited, and "off" periods, i.e. intervals during which there is no excitation of the corresponding field winding. Each switching circuit is arranged and adapted to store energy from the overall circuit power supply during the "off" periods of its associated phase and to supply the stored energy along with the normally available energy from the circuit power supply to the field winding for that phase during its predetermined "on" period, so as to compensate for the finite current rise time owing to the inductance of the winding. In other words, where high switching speeds are desired the driver provides a torque "boost" to the motor by increasing the speed at which the torque-producing magnetic field of each winding builds up, and this is accomplished without the necessity of increasing the output of the power supply. On the other hand, for low switching speed operation the average increase in the amount of energy supplied to the windings is practically negligible, so that, in overall effect, the driver circuit automatically adjusts motor driving torque throughout any variations in switching speed which may be necessary or desirable for the step motor operation.

According to another aspect of the invention, a simple and reliable multi-phase-overlapping generator is provided by which to activate two phases at a time in the switching logic sequence. To this end, the generator employs a separate bistable multivibrator for each pair of phases, in conjunction with a lattice-type diode keying or trigger circuit. The diodes are biased according to the state of the multivibrators to insure that shift pulses applied to the generator will impart the proper energizing sequence to the driver switching circuits.

It is therefore still another object of the present invention to provide an improved multi-phase-overlapping generator for energizing a multi-phase step motor driver.

The above and still further objects, features, and attendant advantages of the present invention will become apparent from a consideration of the following detailed description of specific embodiments thereof, especially when taken in conjunction with the accompanying drawings, in which.

Figure 1:
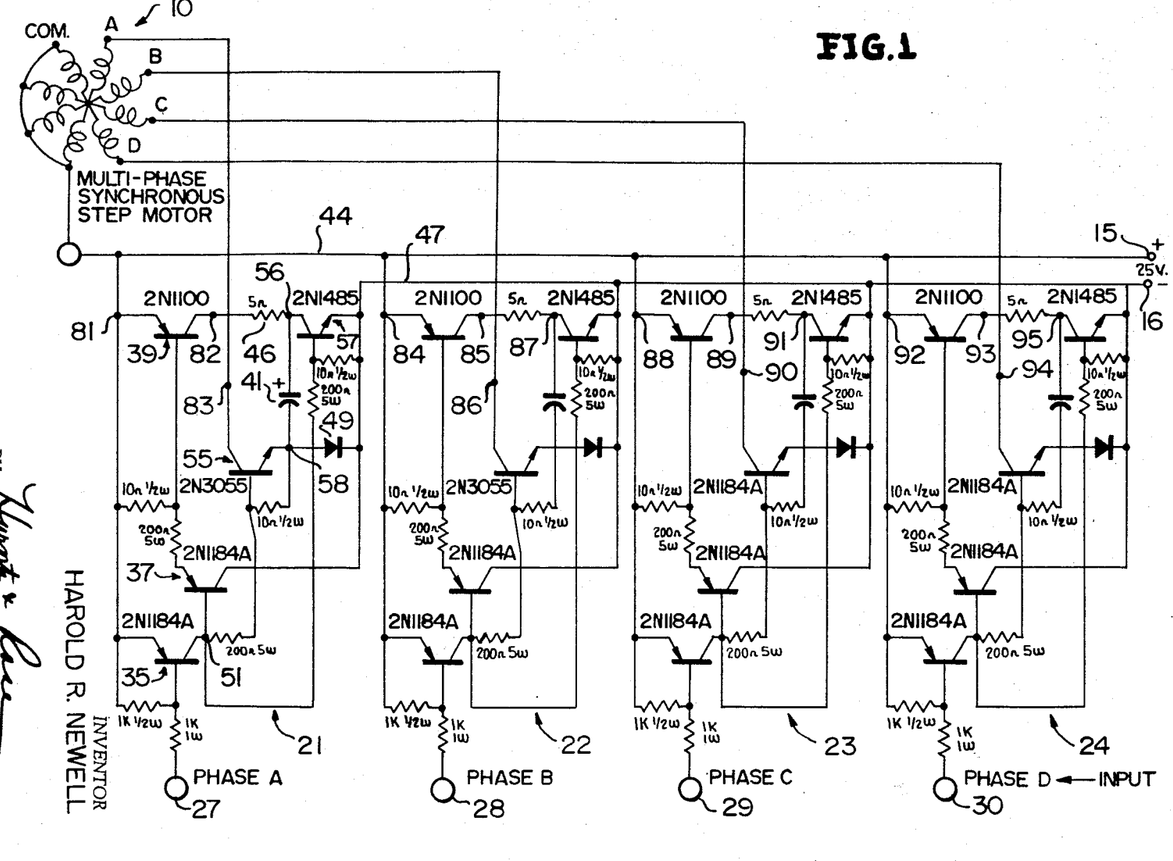
FIGURE 1 is a circuit diagram of one embodiment of a multi-phase step motor driver according to the invention.
Figure 2:
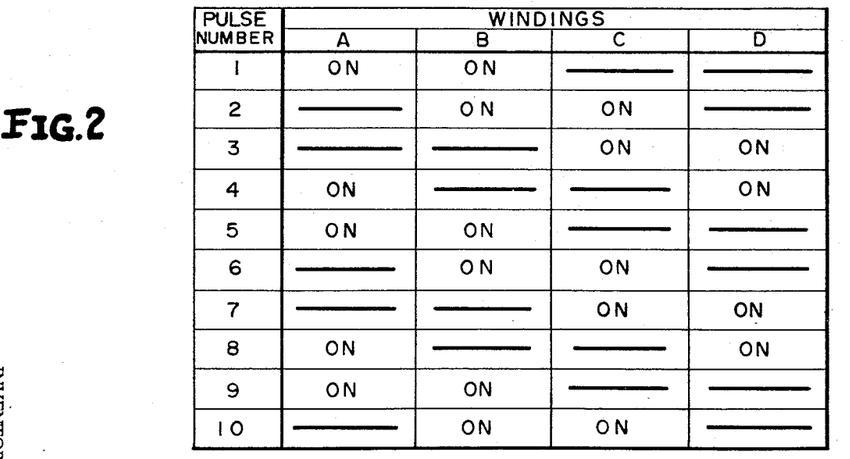
FIGURE 2 is a switching logic diagram illustrating one operational format for the circuit of FIGURE 1.

Referring now to the drawings, and more particularly to FIGURES 1 and 2, field windings A, B, C, D and the common connection of a multi-phase synchronous step motor, generally designated by reference numeral 10, are coupled to a DC voltage supply (not shown) at terminals 15, 16, via four identical driver switching circuits generally designated 21, 22, 23 and 24, for the four phases A, B, C, and D, respectively. The switching circuits are supplied with drive pulses in predetermined sequence at respective input terminals 27, 28, 29 and 30, in a manner to be described presently.

Since the four switching circuits are identical, a description of one will suffice for all. Referring to the circuit 21, corresponding to phase A of the overall driver, in the absence of a driver pulse at terminal 27, PNP transistor 35 is cut off (i.e., rendered non-conductive) by virtue of the bias voltage provided by the power supply. This condition results in the presence of a relatively large negative voltage at the junction 51 between the collector electrode of transistor 35 and the base electrode of PNP transistor 37, sufficient to turn on the latter transistor, and as a result, supplying negative voltage to the base of PNP transistor 39 so that the latter is switched on. With transistor 39 in the conductive state, a charging path exists for capacitor 41, from the positive supply terminal 15 via lead 44, transistor 39, and resistor 46, and from the negative supply terminal 15 via lead 47 and diode 49. Hence, capacitor 41 rapidly charges to a voltage somewhat less than that existing across supply terminals 15 and 16.

When a negative drive pulse, having a level approximately equal to that existing on negative supply line 47, is applied to input terminal 27 of switching circuit 21, transistor 35 is driven into saturation and a positive voltage substantially equal to that on positive supply line 44 thereby exists at junction or node 51. As a result, transistors 37 and 39 are cut off and NPN transistors 55 and 57 are driven into saturation. It will be apparent that the voltage at junction 58 is of substantially greater magnitude than the voltage appearing on negative supply line 47 (the latter voltage being substantially equal to that appearing at junction 56 when transistor 57 is saturated) by virtue of the voltage stored by capacitor 41. This increased voltage is applied via saturated transistor 55 to motor winding A, thereby speeding the buildup of the torque-producing magnetic field. In other words, sufficiently high winding current levels are obtained to provide the desired high stepping torque during those periods in which high switching speeds are employed.

As previously stated and as will be apparent from a consideration of FIGURE 1, all of the switching circuits of the driver are identical in structure and operation, so that pulses may be applied to the various input terminals (e.g. 27–30 in a four phase driver network) in any desired sequence to achieve a particular operation of the step motor. FIGURE 2 is a switching logic chart exemplifying one suitable pulse application sequence. Here, the pulses are applied to the driver switching circuits to produce the winding energizing sequence A and B on, B and C on, C and D on, D and A on, A and B on, etc. by applying the first pulse, referenced to an arbitrary time index, to driver input terminals 27 and 28, the second pulse to terminals 28 and 29, the third pulse to terminals 29 and 30, and so forth.

Capacitor 41 (and corresponding capacitors in each of the other driver switching circuits) discharges at a rate determined by its capacitance value and the impedance of winding A (windings B, C, and D, respectively, in the case of the remaining switching circiuts). In effect, the discharge of the capacitor through its associated winding imparts a substantial increase in rise time to the pulse applied to the winding over that for pulses generated by conventional drivers. The voltage boost provided by the discharge of the voltage stored on each capacitor as its switching circuit is energized in the sequential switching format is effective to compensate for the finite current rise time attributable to inductance of the associated winding.

Purely for the sake of completeness and clarity, the several components of the circuit have been assigned illustrative values and/or standard commercial designations. It is to be understood, however, that the invention is not limited to such component values and types, and that restrictions on the scope of the invention are to be imposed solely in accordance with the appended claims.

Figure 3:
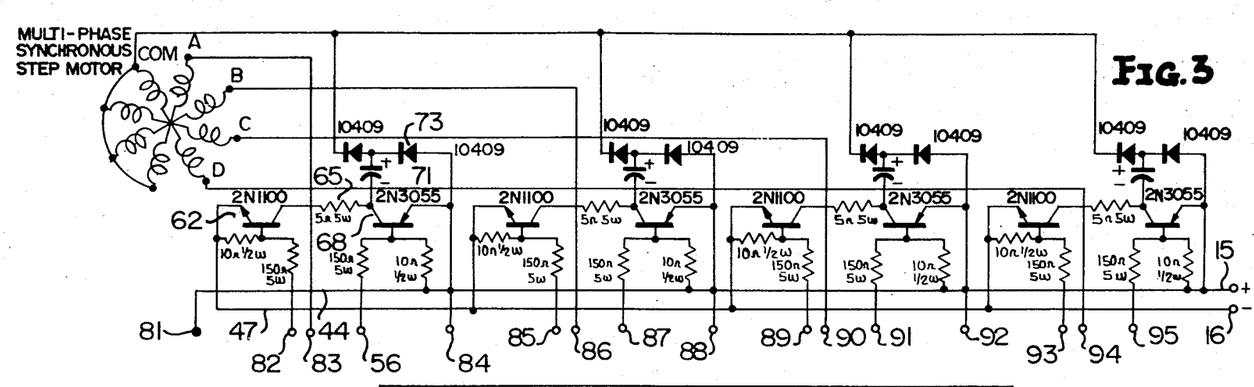
FIGURE 3 is a circuit diagram of an adjunct to the driver of FIGURE 1.

Referring now to the circuit diagram of FIGURE 3, it will be noted that the component assembly there shown is simply an addition to the circuit shown in FIGURE 1, with connections made in accordance with the designated junction points. This arrangement is effective to provide an additional torque boost over that obtained using only the circuitry depicted in FIGURE 1. The basic operation of the circuit of FIGURE 3 is the same as that described above in the discussion of FIGURE 1, except that, here, when transistor 39 is saturated and a positive voltage close to positive line voltage thereby exists at its collector electrode, NPN transistor 62 is driven into saturation, while saturation of transistor 57 will obviously result in saturation of PNP transistor 68; these two events occurring respectively during absence and presence of pulse input at driven terminal 27. The former event results in a charging path for capacitor 71, from negative supply line 47 through transistor 62 and resistor 65, and from positive supply line 44 through diode 73. The voltage stored on capactior 71 is subsequently discharged via the common terminal of the field windings through the winding whose switching circuit is at that time energized (here, field winding A associated with switching circuit 21), by virtue of the saturation of transistor 68. Since in FIGURE 3 the positive supply line 44 is connected to the common terminal of the field windings only via the additional circuitry, unlike the direct connection existing in the assembly in FIGURE 1, the initial effect of discharge of capacitor 71 is a voltage boost at the common terminal similar to that which is simultaneously experienced at the negative terminal end of the field winding of interest (here, winding A), as previously discussed. Hence, the voltage applied to each terminal of the energized winding is increased in this embodiment, resulting in an even further torque boost on the stepping motor. Again, each of the driver phases operates in this manner in the switching sequence.

As in the situation presented by the circuitry of FIGURE 1, the fixed voltage stored by capacitor 71 is discharged to yield an average increase of voltage across its associated winding as a function of the switching rate, the latter determining the time allotted for charge and discharge of each capacitor. Thus, for low pulse repetition rates, i.e. low switching rates, the average increase in voltage across the windings is practically negligible. It is apparent, then, that multi-phase step motor drivers in accordance with the present invention provide a significant increase in torque at high switching speeds over that achievable with conventional drivers, and, at the same time, are not wasteful of power at normal or low switching rates. Moreover, the torque boost is obtained at the higher switching rates without need for increases in supply voltage.

Figure 4:
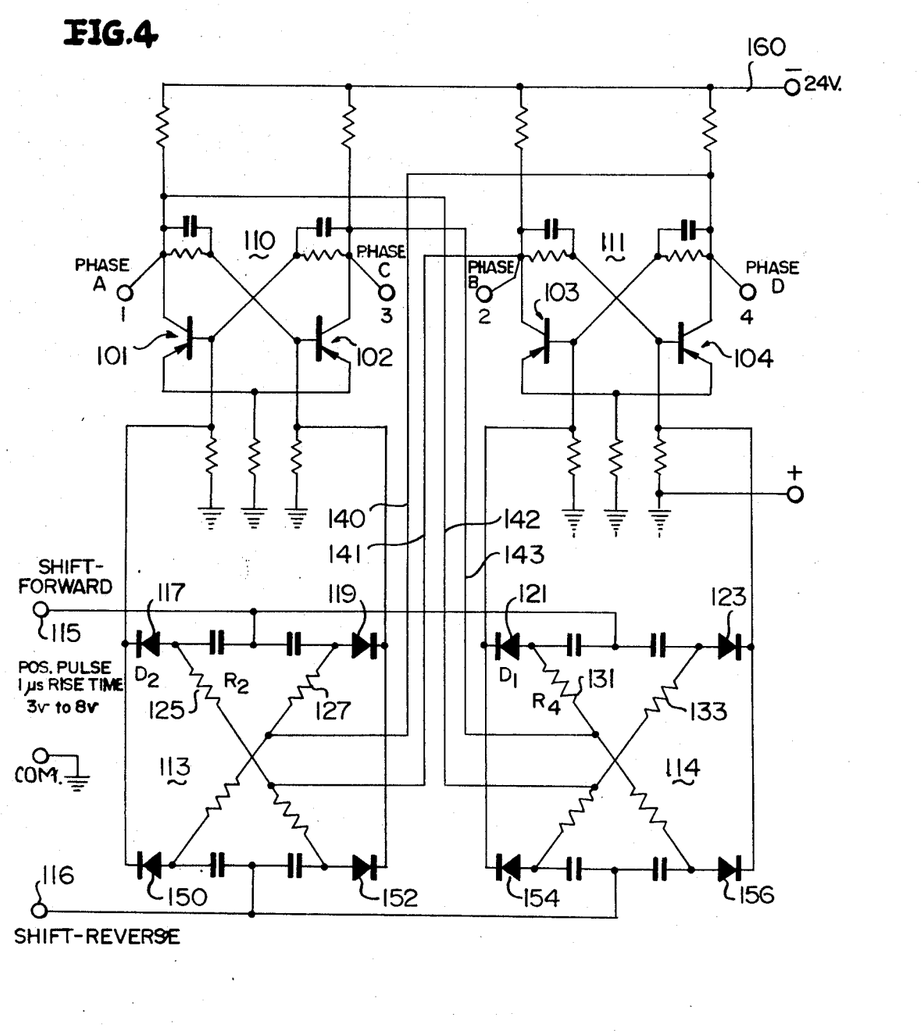
FIGURE 4 is a circuit diagram of an embodiment of the multi-phase-overlapping generator for exciting the drivers of FIGURE 1 or FIGURE 3 according to the switching logic format of FIGURE 2.

Referring now to FIGURE 4, a multiphase overlapping generator suitable for use in application of switching pulses to the driver circuitry for provision of the switching logic of FIGURE 2 may comprise a pair of bistable multivibrators (flip-flops), a pair of lattice-type diode trigger circuits, and associated components and interconnecting circuitry.

Flip-flops 110 and 111 are identical, the collector voltages of PNP transistors 101, 102, 103 and 104 feeding phases A, B, C, and D, respectively, of the driver. That is, the collectors of the transistors in the order stated above are coupled to driver terminals 27, 28, 29 and 30, respectively, of the circuit of FIGURE 1. In order to maintain the switching sequence set forth in the switching logic chart of FIGURE 2, identical trigger circuits 113 and 114 are provided with positive polarity shift pulses applied to terminal 115 or terminal 116 depending upon whether forward or reverse stepping is desired, respectively.

It will be noted from FIGURE 2 that the condition in which phases A and B are "on" (i.e., the respective windings energized) requires that negative pulses approximately equal in magnitude to the voltage magnitude on negative supply line 47 be simultaneously applied to driver input terminals 27 and 28 (FIGURE 1). Such negative voltages appear at the collectors of transistors 101 and 103, associated with phases A and B, if these transistors are switched "off" (i.e., have been rendered non-conductive). Assuming that this is the initial condition of the multi-phase-overlapping generator, and further noting that the several diodes in trigger circuits 113 and 114 are biased according to voltages existing on leads 140, 141, 142 and 143 coupled to the collector electrodes of the several flip-flop transistors, a positive pulse applied to "forward shift" terminal 115 simultaneously encounters diodes 117, 119, 121 and 123, which are respectively reverse, forward, forward, and reverse biased. The relative magnitudes of the shift pulse and the diode biasing voltages are such that the magnitude of the former is insufficient to overcome the latter for the reverse biased condition. Hence, the positive shift pulse is permitted to pass via diodes 119 and 121 only, thereby producing a cut-off bias at the base electrodes of transistors 102 and 103, respectively. Flip-flop 110 is thus switched to the condition in which transistor 101 is "on" and transistor 102 is "off." The cut-off bias applied to the base of transistor 103 of flip-flop 111 is ineffective, however, to change the condition of that flip-flop since, as was assumed initially, transistor 103 is presently in the cut-off state. Hence, the shift pulse applied to terminal 115 subsequent to the condition in which phases A and B are "on" shifts the state of the generator to a condition in which negative voltage is applied to terminals 28 and 29 of the driver, so that phases B and C are now "on" and phases A and D are "off."

The next forward shift pulse is applied to diode 117 (still reverse biased), diode 119 (still forward biased), diode 121 (now reverse biased), and diode 123 (now forward biased), and is thereby passed by diodes 119 and 123 to apply cut-off bias to transistors 102 and 104. Since transistor 102 is presently "off" no change occurs in the state of flip-flop 110, but flip-flop 111 is switched to the condition in which transistor 104 is "off" and transistor 103 "on." Thus phases C and D are now "on" and phases A and B are "off."

Figures 5, 7:
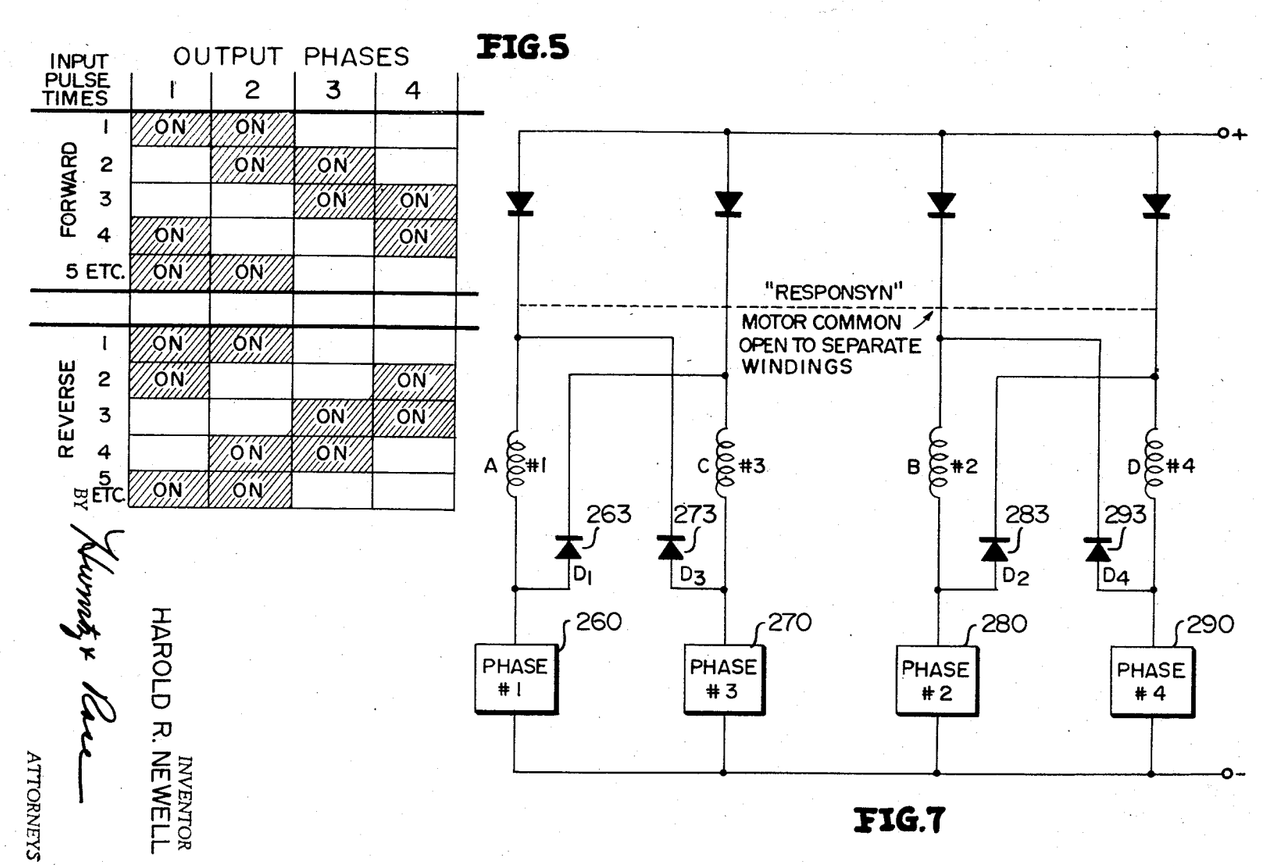
FIGURE 5 is a switching logic diagram for the circuit of FIGURE 4.
FIGURE 7 is a circuit diagram of a multi-phase driver incorporating means for utilizing the reverse voltage surge across the field windings upon collapse of the magnetic field.

Similar considerations for succeeding shift pulses will readily indicate that the multi-phase-overlapping generator operation follows the "forward" switching logic diagram of FIGURE 5 and that the stepping motor field windings are energized according to the switching logic diagram of FIGURE 2. It will also be apparent to those skilled in the art that "reverse" shift pulses (also of positive polarity) applied to terminal 116 of the generator result in the switching logic set forth in the "reverse" portion of the chart of FIGURE 5. For example, if the condition of the generator is such that phases C and D are "on" and phases A and B "off" (corresponding to transistors 101 and 103 in the conductive state and transistors 102 and 104 in the non-conductive state), i.e., the last condition described above, and a positive pulse is now applied to "reverse shift" terminal 116, the pulse is permitted to pass via diodes 152 and 154 but is prevented from passage through diode 150 and 156 because of the back biased condition existing on the latter two diodes. Cut-off bias is thereby applied to transistors 102 and 103, and, since transistor 102 is presently in the cut-off state, only flip-flop 111 will undergo switching action, viz. transistor 103 switched "off" and transistor 104 switched "on." The collector electrodes of transistors 102 and 103 are therefore at a negative voltage substantially equal to that on negative supply line 160, while the collectors of transistors 101 and 104 are pulled to the voltage existing at their emitter electrodes (a non-negative voltage). The negative voltage applied to terminals 28 and 29 results in energization of windings B and C so that the circuit has undergone a shift from the condition designated pulse 3 to that designated pulse 4 in the "reverse" portion of the switching logic diagram of FIGURE 5. It will be understood, of course, that pulse numbering in the logic diagram is referenced to an arbitrary time index.

Figure 6:
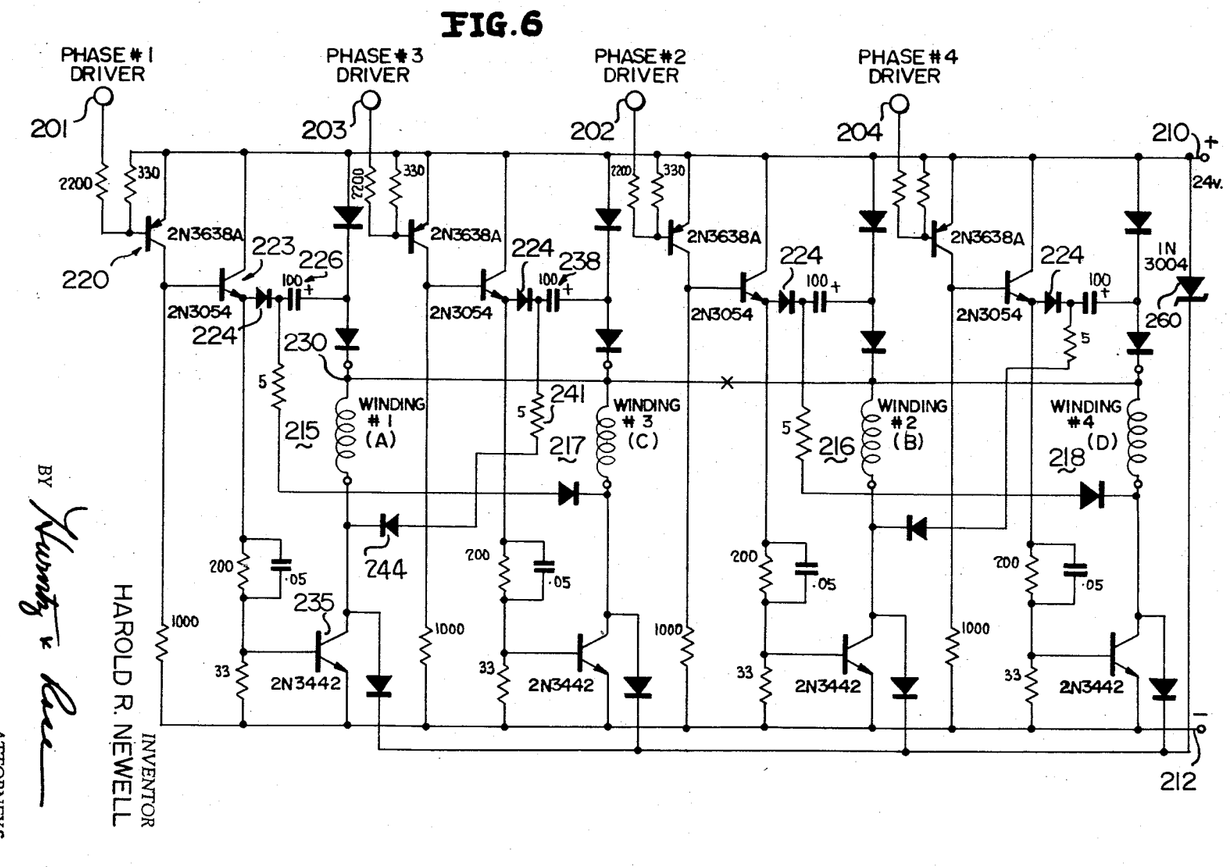
FIGURE 6 is a circuit diagram of still another embodiment of a multi-phase step motor driver in accordance with the invention.

Referring now to FIGURE 6, another embodiment of the stepping motor drive circuit, phases A and C are again complementary (i.e., phase A "on" when phase C "off," and vice versa), as are phases B and D. This corresponds to the switching logic chart set forth in FIGURE 2. In FIGURE 6, this complementary relationship is further emphasized by the side-by-side placement of the driver switching circuits 215, 217, 216, and 218, corresponding respectively to driver phases A, C, B and D. Driver input pulses generated by any suitable multi-phase-overlapping generator, such as that shown in FIGURE 4, are applied to terminals 201, 203, 202, and 204, as required to excite the respective field windings of the step motor. Positive supply line 210 and negative supply line 212 are connected to respective terminals of a DC voltage source.

A negative polarity pulse applied to driver terminal 201 (phase A) drives PNP transistor 220 into saturation so that its collector electrode is pulled to the voltage existing on positive supply line 210. Hence, NPN transistor 223 is switched "on," completing a low resistance path between the positive supply line and the negative terminal of capacitor 226. The capacitor, which was charged during the preceding pulse step time interval, is now discharged through winding A via common terminal 230, thereby increasing the voltage across winding A and the speed at which the magnetic field builds up during the critical initial portion of the step interval. Simultaneously, transistor 235, which has also been rendered conductive, connects the negative terminal of capacitor 238 of the complementary driver phase circuit (i.e., switching circuit 217, phase C) to the negative supply line via resistor 241 and diode 244. Thus, the storage capacitor of one of each of the complementary phases is charged while the capacitor of the respectively associated complementary phase is discharged. Diodes 224 are employed for purposes of decoupling.

Zener diode 260 serves to clip the voltage peaks created by the sudden collapse of the magnetic field when a field winding is de-energized.

Operation of the drive circuit of FIGURE 6 follows the switching logic diagram of FIGURE 2, assuming that sequence of energization is being employed by way of application of pulses to the driver input terminals, as will be readily apparent to those skilled in the art. The circuit of FIGURE 6 is less complex, and, accordingly, less expensive to implement, than the drive circuit of FIGURE 1, but the basic principle involved is the same, i.e., storage of voltage during "off" periods of the several phases and application of the stored voltage to the respective field winding or windings during the immediately succeeding "on" periods of the phases.

Multi-phase drivers according to the present invention are particularly applicable to stepping motors of the type commercially marketed under the name "Responsyn Actuators" by United Shoe Machinery Company, but it is to be emphasized that the invention is not limited thereto, and may be applied to any multi-phase step motor of suitable characteristics.

The circuit of FIGURE 7 is useful to prevent the significant energy waste which normally accompanies the collapse of the magnetic field produced by an energized winding when the winding excitation is removed. It is known that the rapidly decaying magnetic field causes a high voltage spike of opposite polarity to be developed across the winding, and in a typical driving circuit the spike is clamped to a sufficiently low level to protect the driving transistors from breakdown. The resultant energy waste may be substantially eliminated by use of a circuit such as that exemplified by the circuit diagram of FIGURE 7. Here, the switching circuits of the driver for a four-phase synchronous step motor are designated 260, 270, 280 and 290, corresponding, for example, to the switching circuits previously discussed in accompanying figures.

Complementary phases are again shown in side-by-side relationship; thus, winding A, driven by switching circuit 260, is adjacent winding C, driven by switching circuit 270, with a similar driving arrangement existing for complementary phases B and D. The circuit is effective to couple the reverse voltage across a winding from which driving excitation has been removed to its respective complementary winding. Assume, for example, that winding C has just been de-energized so that a reverse voltage spike (i.e., a voltage having a polarity opposite that shown at the voltage supply terminals) is developed across the winding. The spike renders diode 273 conductive, and is thus applied to complementary winding A (which is now excited in the switching logic sequence) to increase the initial current through the latter winding and thereby to enhance the buildup of magnetic field associated with that winding. A similar set of events occurs during operation of complementary phases B and D. It will, of course, be understood that the complementary windings are at right angles to each other so that no problem of magnetic coupling exists.

Figure 8:
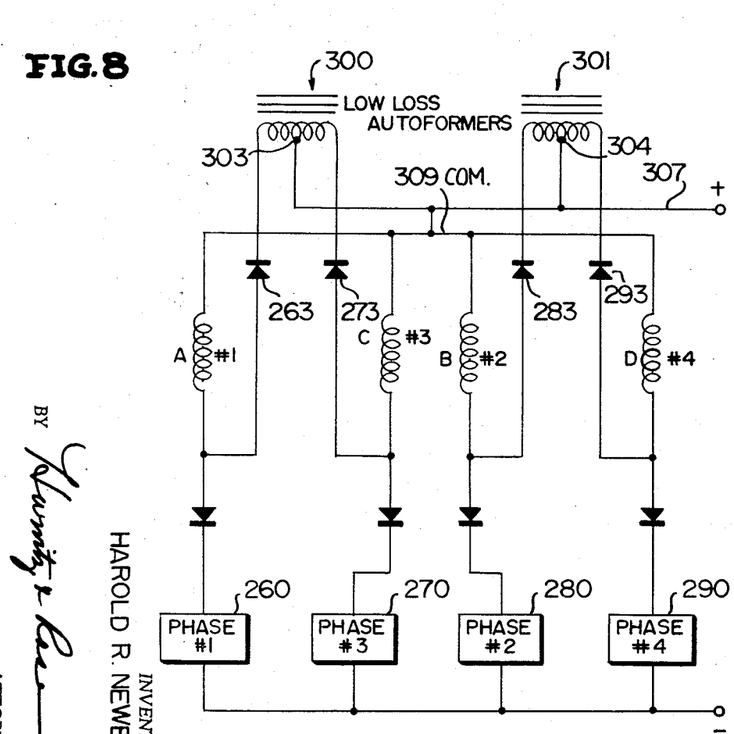
FIGURES 8 and 9 are circuit diagrams of alternate embodiments of a driving network for utilizing the reverse voltage surge to enhance magnetic field buildup.

In the circuit of FIGURE 7, the common lead of the step motor windings is opened to insure that each winding is separate. A modification which eliminates this requirement may be implemented by coupling diodes 293 to opposite ends of autoformer 301. The center to reverse the voltage polarity. Such an arrangement is shown in FIGURE 8. Diodes 263 and 273 are coupled to opposite ends of autoformer 300, and diodes 283 and 293 are opposite ends of autoformer 301. The center tap 303, 304 of each autoformer (transformer) is connected to the positive supply line 307 and to the common lead 309 of the field windings. This embodiment retains the common connection by coupling the opposite polarity spikes to the complementary winding via the polarity reversing autoformers, thereby aiding the buildup of the field of the complementary winding.

The subject matter of FIGURES 7 and 8 is claimed in the copending application of the same inventor, said copending application entitled "Energy Transfer Means for Stepping Motors," filed Jan. 28, 1969.

Figure 9:
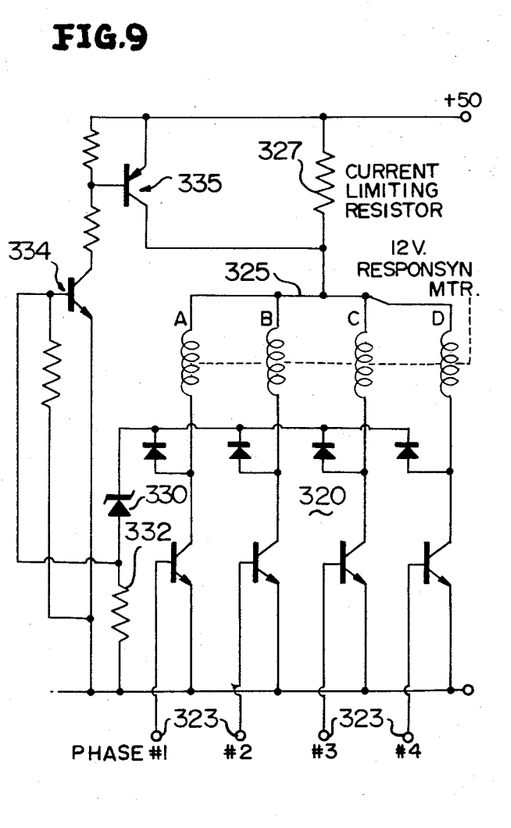

Another embodiment of the invention for improving the torque performance of digital step motors at high stepping rates is shown in FIGURE 9. Here, the four phases of the step motor are fed by a conventional driver circuit 320 which applies a fixed voltage to one or more of the winding phases A, B, C, D in accordance with switching pulses of the desired sequence applied at terminals 323 to produce the stepped rotation of the moving element of the motor. The embodiment of FIGURE 9 operates to apply a high voltage step directly to the respective motor winding for a relatively short period of time at the start of each switching cycle, thereby enhancing the buildup of current in that winding so that the curve of torque versus speed begins to slope off only after relatively high rates are reached.

To this end, the common motor lead 325 is fed from a high voltage source (designated +50 v.) through a resistor 327 for limiting current to the motor in the stopped condition. As previously explained, each time a switching cycle (i.e., motor "step" cycle) is initiated the winding which is turned off generates a high voltage spike of reverse polarity as its magnetic field collapses. A Zener diode 330 is utilized in parallel with the transistor switches of the driver 320 to limit the amplitude of the spike to a sufficiently low value to prevent damage to the transistor switches. By connecting a resistor 332 in series circuit with the Zener diode in the ground leg path a voltage is developed across that resistor each time the Zener voltage is exceeded. According to this embodiment of the invention, a switching circuit including transistors 334 and 335 is utilized to compensate for the customary drop off of motor current, and therefore of torque, at high switching (stepping) rates.

The base electrode of NPN transistor 334 is connected to the high end of resistor 332 and the emitter electrode to the negative supply. The input to PNP transistor 335 is taken from a load resistor coupled to the collector of transistor 334. The output circuit of transistor 335 is connected across current limiting resistor 327. When the Zener voltage is exceeded by the reverse voltage spike accompanying the collapse of magnetic field of one of the motor windings, a positive voltage is developed at the high end of resistor 332, switching transistor 334 from its normal state of cut-off to high conductivity. A negative voltage is thereby applied to the base electrode of transistor 335 to turn on that transistor such that current limiting resistor 327 is shorted out for the duration of time that the Zener voltage level is exceeded. Hence, the total supply voltage is applied, for that same duration of time, directly across the next winding or windings turned on in the switching sequence, producing a rapid buildup of the magnetic field of those windings. The inherent positive feedback action of the circuit results in rapid switching of shunt transistor 335 from cut-off to saturation and vice versa, but self-sustaining switching (i.e., oscillation) is prevented by hysteresis.

It will be clear that while I have disclosed certain embodiments of my invention, variations in the specific details of construction and operation which have been illustrated and described may be resorted to without departing from the spirit and scope of the invention. Limitations are to be imposed on the invention, therefore, only in accordance with restrictions set forth in the appended claims.

I claim:

1. Control circuitry for exciting the field windings of a multi-phase step motor, comprising a driver circuit for applying energizing currents to said field windings in a predetermined sequential switching format, so that each field winding is energized during certain preselected time increments of said switching format and de-energized during certain other preselected time increments of said switching format; a power supply for said driver circuit; said driver circuit including a plurality of switching circuits corresponding in number to the number of stepping phases to which said motor is to be subjected during one complete period of rotor rotation, each of said switching circuits including means for storing energy from said power supply during time increments in which the associated field winding is de-energized and for supplying the stored energy in the form of additional energizing current to said associated field winding during time increments in which said associated field winding is energized.

2. The combination according to claim 1 wherein said means for storing and supplying includes a capacitor, and a plurality of switches coupled to said capacitor and to said power supply and responsive to said switching format to connect said capacitor across said power supply during said time increments in which said associated field winding is de-energized and to apply a voltage derived from said power supply plus the voltage stored by said capacitor to said associated field winding during said other time increments.

3. The combination according to claim 2 wherein the time constants determining the charging and discharging rates of said capacitor are less than each respective increment of time during which said associated field winding is de-energized and energized.

4. The combination according to claim 2 wherein said capacitor is connected between a terminal of one polarity of said power supply and one terminal of said associated field winding during said other time increments, and wherein said means for storing and supplying includes a further capacitor and associated switches, said associated switches coupled to said further capacitor and to said power supply and responsive to the opeartion of the first-mentioned switches to connect said further capacitor across said power supply during said time increments in which said associated field winding is de-energized and to connect said further capacitor between the opposite polarity terminal of said power supply and the other terminal of said associated field winding during said other time increments, so that the voltage applied to said associated field winding during said other time increments is the summation of the voltage derived from the power supply and the voltages stored by the first-named and further capacitors.

5. The combination according to claim 1 wherein is further included means responsive to serial shift pulses of either a forward or reverse designation of control of direction of rotor rotation for energizing said switching circuits according to said switching format to excite said windings in the appropriate sequence for effecting the forward or reverse direction of rotor rotation, respectively.

6. The combination according to claim 5 wherein said means for energizing said switching circuits comprises a plurality of bistable multivibrators each adapted to supply or to remove energizing voltages to selected switching circuits according to its present stable state, and a separate diode trigger circuit associated with each multivibrator and responsive to said serial shift pulses for varying the state of the associated multivibrator according to the trigger circuit diode biasing voltages deriving from the present states of the several multivibrators.

7. A multi-phase control circuit for supplying energizing pulses to any one or more of a plurality of output terminals, corresponding in number to the number of phases of said control circuit, during successive equal intervals of time according to a predetermined switching sequence, said control circuit comprising a plurality of switching circuits, each coupled to a separate respective one of said output terminals; a DC power supply coupled to all of said switching circuits and from which said energizing pulses are to be derived; each of said switching circuits including at least one energy storage element, and a plurality of switches coupled to said at least one energy storage element for applying energy to said element from said power supply while simultaneously isolating said power supply from the respective output terminal during time intervals in which the respective switching circuit is deactivated, and for applying energy from said power supply and energy stored by said element to the respective output terminal during time intervals in which the respective switching circuit is activated; and means for activating and deactivating said switching circuits in accordance with said predetermined switching sequence.

8. The combination according to claim 7 wherein said DC power supply is a voltage source and wherein said energy storage element is a capacitor, said switches being arranged and adapted to connect said capacitor across said voltage source during the time interval in which the respective switching circuit is deactivated, and to connect the capacitor and the voltage source in series with the respective output terminal so that the voltage stored by the capacitor and the voltage of the source are additive at the respective output terminal during the respective activation time interval.

9. Apparatus for controlling the excitation of field windings of a multi-phase step motor for equal intervals of time in accordance with a predetermined sequential excitation format, said format being characterized by the excitation of certain windings during intervals in which certain other windings are unexcited and vice versa, so that the windings form complementary pairs; said apparatus comprising a plurality of driver circuit means, each associated with a respective one of the field windings; a DC power supply coupled to all of said driver circuit means; each driver circuit means including an energy storage element coupled to the driver circuit means for a complementary winding; and each driver circuit means further including a plurality of switches so arranged that when the respective driver circuit means is energized according to said format the storage element of the complementary de-energized driver circuit means is connected to receive energy from said power supply, while simultaneously therewith energy stored by the storage element of the energized driver circuit means during the preceding time interval in which the complementary driver circuit means was energized is additively applied with energy from said power supply to the associated field winding.

10. The combination according to claim 9 including a multi-phase-overlapping generator responsive to serial input pulses for supplying output pulses in accordance with said sequential excitation format, and means for applying said output pulses to said plurality of driver circuit means for energization thereof; said generator including a plurality of bistable multivibrators, each associated with a complementary pair of said driver circuit means and a diode keying circuit for controlling the states of said multivibrators and thereby the sequence of energization of said driver circuit means; said keying circuits being responsive to said serial input pulses for passage thereof in accordance with the biasing of the diodes in the keying circuits by voltages commensurate with the states of said multivibrators.

11. The combination according to claim 9 further including means coupled to all of said driver circuit means for clipping reverse voltage peaks occurring upon collapse of the magnetic field about each winding when the respective winding excitation is removed.

12. Control circuitry for exciting the field windings of a multi-phase step motor, comprising a driver circuit for applying energizing currents to said field windings in a predetermined switching format, so that each field winding is energized during certain preselected time increments of said switching format and de-energized during certain other preselected time increments of said switching format; a power supply having a pair of output terminals; means coupling at least a portion of said driver circuit and each of said field windings across the output terminals of said power supply, said means including a common lead connected to each of said field windings and current limiting means connected in series circuit between said common lead and one of said power supply output terminals; and a switching circuit responsive to the reverse voltage surge accompanying the collapse of the magnetic field about a field winding when that winding is de-energized for bypassing said current limiting means to apply the total power supply output to the next field winding to be energized in said switching format.

References Cited

UNITED STATES PATENTS

| | | | |
|---|---|---|---|
| 3,002,114 | 9/1961 | Englund | 307—110 |
| 3,240,958 | 3/1966 | Kerios | 307—110 |
| 3,379,946 | 4/1968 | Croymans | 318—138 |

ORIS L. RADER, *Primary Examiner.*

G. SIMMONS, *Assistant Examiner.*

U.S. Cl. X.R.

307—110; 315—223